No. 622,206. C. A. CLAFLIN. Patented Apr. 4, 1899.
FISH HOOK.
(Application filed Apr. 17, 1897.)
(No Model.)
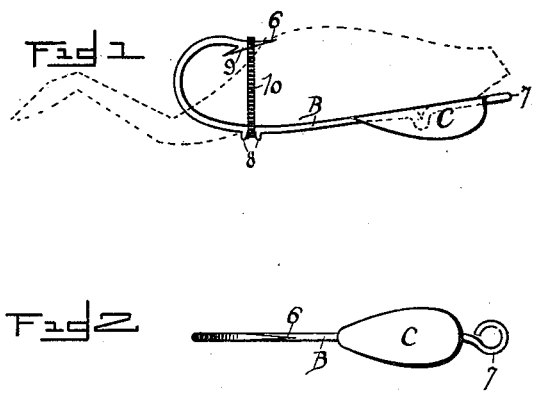
WITNESSES:
A.C. Hiss.
A. M. Elkjer.
Clarence A Claflin
INVENTOR
BY
ATTORNEY.

UNITED STATES PATENT OFFICE.

CLARENCE A. CLAFLIN, OF OMAHA, NEBRASKA.

FISH-HOOK.

SPECIFICATION forming part of Letters Patent No. 622,206, dated April 4, 1899.

Application filed April 17, 1897. Serial No. 632,541. (No model.)

*To all whom it may concern:*

Be it known that I, CLARENCE A. CLAFLIN, residing at Omaha, in the county of Douglas and State of Nebraska, have invented certain useful Improvements in Fish-Hooks; and I do hereby declare that the following is a full, clear, and exact description of the invention, such as will enable others skilled in the art to which it appertains to make and use the same, reference being had to the accompanying drawings, which form a part of this specification.

This invention has relation to a new and novel improvement in fish-hooks.

My invention relates more particularly to that class of fish-hooks known as "trailers" and used in conjunction with a leading hook to which the trailer is secured, the trailer more particularly comprising a hook adapted to hold and receive the bait, while the leading hook is the one upon which the game is more apt to be caught, though the game of course is also caught upon the trailer holding the bait.

In the accompanying drawings I have shown in Figure 1 a side elevation of a trailer embodying my invention, showing a frog in outline, while Fig. 2 shows a top view of my trailer with the keeper removed.

The object of my invention is to provide a trailing fish-hook that shall be adapted to receive a bait, and embodies, essentially, a hook of suitable construction having the usual loop and barb and further provided near the loop end with a sinker and in the stem opposite the barb with a retaining-seating adapted to receive a keeper working within said seating and over the barb of the hook, as is shown in Fig. 1.

The hook B is of any suitable size, shape, or material, having the usual barb 6 and the loop 7; but near the loop end the hook is preferably given a slight bend, as is shown in dotted lines in Fig. 1, so that my sinker C may be cast thereon and be tightly held.

My sinker embodies, essentially, a body of metal having a flat top terminating at or a suitable distance above the edge of the hook to provide a flat riding-surface, and this flat riding-surface in outline is egg shape, with the butt or largest end near the loop of the hook. In cross-section this sinker is in the shape of half an egg, the largest amount of metal being near the loop or butt end of the sinker and gradually working to a point, as is shown in Fig. 1.

The stem B is preferably provided opposite the barb 6 with the shoulders 8 to provide a seating, within which a small elastic band, a string, or any other suitable material may be held. These shoulders 8, it should be noticed, are positioned opposite the barb 6, so that the keeper will be held within the retaining-seating and work over the barb, so that the bait, which is adapted to rest upon the flat upper surface of the sinker, may be nicely secured to the hook. When a frog is used as bait, the head end of the body is permitted to rest upon the flat upper surface of the sinker C, while the barb of the hook is carried between the legs of the frog and then forced under the skin upon the back of the frog, so as not to injure the same, when the rubber keeper 10 is carried over the frog's legs and then into the retaining-seating of the hook upon the barb, in which position the keeper acts as a belt surrounding the frog's body and retaining the same upon the trailer. It is of course understood that the body would be secured at the head to the lead-hook.

In throwing my hook the weight of the sinker C insures the frog being cast belly downward in a natural position, and so, also, as the hook sinks the frog is carried belly downward and head foremost in a natural position.

Now, having described my said invention, what I claim as new, and desire to secure by United States Letters Patent, is—

1. As a new article of manufacture a fish-hook of any suitable size, material or conformation provided in the main stem opposite the barb with a retaining-seating, as and for the purpose set forth.

2. As a new article of manufacture a fish-hook of any suitable size, material or conformation, provided in the main stem opposite the barb with a retaining-seating in combination with a keeper adapted to be secured to the barb and to said seating.

3. As a new article of manufacture a fish-hook of any suitable size, material or conformation provided in the main stem opposite the barb with a retaining-seating and at the loop end with a sinker, as and for the purpose set forth.

4. As a new article of manufacture a fish-hook of any suitable size, material or conformation, provided in the main stem opposite the barb with a retaining-seating, and at the loop end with a sinker having a flat upper surface, as and for the purpose set forth.

5. As a new article of manufacture a fish-hook of any suitable size, material or conformation, provided in the main stem opposite the barb with a retaining-seating, and at the loop end with a sinker having a flat upper surface, in combination with a keeper adapted to be secured to the barb and to said seating, as and for the purpose set forth.

6. The combination with a fish-hook, of a sinker secured near the loop end to said hook, said sinker having an upper flat surface, approximately pear-shaped in outline, positioned on the side adjacent to the barb of the hook and having its base or greatest amount of metal near the loop end, said flat-surfaced sinker being approximately triangular-shaped in cross-section with the greatest amount of metal near the loop end.

In testimony whereof I affix my signature in presence of two witnesses.

CLARENCE A. CLAFLIN.

Witnesses:
GEORGE W. SUES,
ANE M. ELLYER.